United States Patent
Lu et al.

(10) Patent No.: US 11,733,098 B2
(45) Date of Patent: Aug. 22, 2023

(54) SILICON FOURIER TRANSFORM SPECTROMETER AND OPTICAL SPECTRUM RECONSTRUCTION METHOD

(71) Applicant: Shanghai Jiao Tong University, Shanghai (CN)

(72) Inventors: Liangjun Lu, Shanghai (CN); Junjie Du, Shanghai (CN); Linjie Zhou, Shanghai (CN); Jianping Chen, Shanghai (CN); Jiao Liu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 48 days.

(21) Appl. No.: 17/561,679

(22) Filed: Dec. 23, 2021

(65) Prior Publication Data
US 2022/0187129 A1    Jun. 16, 2022

Related U.S. Application Data (63) Continuation of application No. PCT/CN2021/079679, filed on Mar. 9, 2021.

(30) Foreign Application Priority Data

Jul. 30, 2020  (CN) .......................... 202010753010.8

(51) Int. Cl.
G01J 3/45    (2006.01)
G01J 3/18    (2006.01)

(52) U.S. Cl.
CPC ............... *G01J 3/45* (2013.01); *G01J 3/1895* (2013.01)

(58) Field of Classification Search
CPC .................................. G01J 3/45; G01J 3/1895
See application file for complete search history.

(56) References Cited

U.S. PATENT DOCUMENTS 10,151,634 B2 * 12/2018 Abdulhalim ............. G01J 4/00
10,481,000 B2 * 11/2019 März ................... G01N 21/3563
(Continued)

FOREIGN PATENT DOCUMENTS

CN    103070669 A    5/2013
CN    108120504 A    6/2018
(Continued)

OTHER PUBLICATIONS

Omar Manzardo et al., "Miniaturized time-scanning Fourier transform spectrometer based on silicon technolgy," Optics Letters, vol. 24, No. 23, pp. 1705-1707 (1999).
(Continued)

*Primary Examiner* — Tarifur R Chowdhury
*Assistant Examiner* — Kemaya Nguyen
(74) *Attorney, Agent, or Firm* — Mei & Mark LLP; Manni Li (57) ABSTRACT

A silicon Fourier transform spectrometer and an optical spectrum reconstruction method are disclosed. The spectrometer includes a waveguide input coupler, cascaded optical switches, unbalanced subwavelength grating (SWG) waveguide pairs, and a germanium silicon detector, where the cascaded optical switches are connected through unbalanced SWG waveguide pairs. The state of the optical switches are adjusted to digitally configure the optical path, so as to constitute a series of unbalanced Mach-Zehnder interferometer (MZI) arrays with different optical path differences, to realize a Fourier transform spectrometer based on spatial heterodyne. The optical spectrum is reconstructed by using a compressed sensing algorithm.

8 Claims, 3 Drawing Sheets

(56) References Cited

U.S. PATENT DOCUMENTS

| | | | |
|---|---|---|---|
| 10,900,838 B1 * | 1/2021 | Podmore | G01J 3/1895 |
| 10,983,003 B2 * | 4/2021 | Kita | G01J 3/45 |
| 2013/0271759 A1 | 10/2013 | Fattal et al. | |
| 2019/0331529 A1 | 10/2019 | Hu et al. | |

FOREIGN PATENT DOCUMENTS

| | | |
|---|---|---|
| CN | 109253986 A | 1/2019 |
| CN | 110044484 A | 7/2019 |

OTHER PUBLICATIONS

Etienne Le Coarer et al.,"Wavelength-scale stationary-wave integrated Fourier-transform spectrometry," Nature Photonics, vol. 1, pp. 473-478 (Aug. 2007).

* cited by examiner

SILICON FOURIER TRANSFORM SPECTROMETER AND OPTICAL SPECTRUM RECONSTRUCTION METHOD

CROSS-REFERENCE TO RELATED APPLICATIONS

The subject application is a continuation of PCT/CN2021/079679 filed on Mar. 9, 2021, which claims priority on Chinese Application No. 202010753010.8 filed Jul. 30, 2020 in China. The contents and subject matter of the PCT international application and Chinese priority application are incorporated herein by reference.

TECHNICAL FIELD

The present invention relates to optical detection and sensing, particularly, a Fourier transform spectrometer on a silicon substrate and an optical spectrum reconstruction method.

BACKGROUND ART

An infrared spectrometer performs analysis and identification of the molecular structure and chemical composition of substances based on their absorption characteristics of infrared radiation at different wavelengths. It is one of the most effective means for chemical analysis. A conventional Fourier transform spectrometer, for example, a Michelson interferometer, generates interference fringes by moving a reflection mirror to change the optical path difference between two beams of light and performs spectral retrieval by using fast Fourier transform. A longer optical path difference indicates higher measurement resolution of the spectrum. A conventional desktop Fourier transform spectrometer generally needs to operate in a laboratory environment, and a mechanical motion module in the system needs to be aligned with high accuracy. Consequently, there are disadvantages such as high cost, large size, inconvenience to carry and use. With further expansion of the application of spectrometers, the demand for portability and environmental robustness gears the development of the miniaturized Fourier transform spectrometer. A reported Fourier transform spectrometer based on a micro-electro-mechanical system (MEMS) achieves system miniaturization but still contains relatively fragile moving component. The best solution is to have no moving component (See Opt.Lett., vol. 24, No. 23, pp. 1705-1707, 1999).

In recent years, with continuous progress of integrated photonic technologies, especially the rapid development of silicon photonics, integration and functional complexity of the photonic chips continue to increase, and application fields of integrated photonic chips are no longer limited to optical communications but are expanded to fields such as autonomous driving, photonic neural network, quantum signal processing, and biological sensing. Research on an on-chip Fourier transform spectrometer has gradually become a hot spot. The on-chip Fourier transform spectrometer with no moving part has advantages of small size, light weight, low power consumption, and low cost, which can meet requirements for laboratory-on-a-chip (Lab-on-a-chip), biological detection and cosmic particle detection in the future.

Existing on-chip Fourier transform spectrometers can be mainly divided into two categories, namely, stationary wave integrated Fourier transform (abbreviated as SWIFT below) spectrometers and spatial heterodyne spectrometers (abbreviated as SHS below).

A SWIFT-based spectrometer generates stationary wave interference fringes by using two oppositely propagating light beams in a waveguide and arranges a detector array above the waveguide to receive an interference pattern of scattered light from the waveguide. The type of device requires only a small chip size to achieve high resolution. However, according to research work, the period of the interference fringes is $\lambda/2n_{eff}$ and is much smaller than the pitch of an existing detector array. Therefore, the measured interferogram is undersampled, resulting in limited spectral bandwidth (See E. Coarer et al., Nat. Photon., vol. 1, pp. 473-478 (2007)). Moreover, in all existing solutions, interference fringes are received by placing an infrared camera above the waveguide. Therefore, it is difficult to achieve miniaturization of the entire system.

A spectrometer based on the SHS structure generally generates a spatially transformed interference pattern by changing an arm length difference or optical path difference of an asymmetric Mach-Zehnder interferometer (abbreviated as MZI below). Currently, there are mainly two ways to change optical path difference: one is to change the effective optical path length of one of the arms by using an electro-optic effect or a thermo-optic effect, and the other is to generate an interference pattern by using a series of MZI arrays with different optical path differences. Based on the first manner, because the change of refractive index and the length of the waveguide obtained by using the thermo-optic or electro-optic effect is small, power consumption is generally large and resolution is relatively low. Although resolution of a given spectral bandwidth can be increased in the second manner, a quite large quantity of MZIs is required, which also means that the device size increases rapidly with an increase in the spectral resolution. The device size can be reduced by using a subwavelength grating structure.

In addition, in recent years, many scientific researchers have proposed different solutions to improve the performance of the on-chip Fourier transform spectrometer, such as separately integrating optical switches on interference arms of the MZIs to achieve digital modulation of the optical path difference, reducing the quantity of MZIs through polarization multiplexing, reducing temperature sensitivity by using a temperature-dependent calibration matrix, and so on.

Since being proposed in 2007, the on-chip Fourier transform spectrometer based on an integrated optical waveguide has become a research hot spot in recent years. From the current research progress, the on-chip spatial heterodyne spectrometer can achieve up to pm-scale resolution, and there are relatively many research results. However, SHS based on active optical path difference modulation has relatively high power consumption and resolution is only nm-scale; and for the asymmetric MZI array based SHS, a high quality spectral resolution and large bandwidth is related to the quantity of MZIs, and therefore it is difficult to balance the bandwidth and resolution. In addition, impact of environmental temperature on the on-chip Fourier transform spectrometer also greatly limits the practical application of the on-chip Fourier transform spectrometer. In conclusion, the existing on-chip Fourier transform spectrometer has a large gap with the existing advanced desktop Fourier transform spectrometer in terms of effective resolution points, spectral range, and practicality.

SUMMARY OF THE INVENTION

In view of the defects in the foregoing existing implementation solutions, the present invention provides a silicon Fourier transform spectrometer and an optical spectrum reconstruction method. A chip part thereof is based on a model of spatial heterodyne spectrometer, and mainly comprises a waveguide input coupler, cascaded optical switches, unbalanced subwavelength grating (SWG) waveguide pairs, and a germanium silicon detector. The present invention achieves a series of unbalanced MZI arrays with different optical path differences by using the digital optical path selection and the unbalanced SWG waveguide pairs, which has advantages of reducing the chip size and increasing spectral resolution. The structure of the SWG waveguide pair is designed and optimized so that a temperature-dependent phase difference shift in the MZI is effectively eliminated in a relatively wide wavelength range, thereby improving the temperature stability of the chip. In addition, the resolution of the chip is effectively improved by using a spectrum reconstruction algorithm based on compressive sensing.

To achieve the foregoing objectives, a technical solution of the present invention is as follows. The silicon Fourier transform spectrometer of the present invention comprises a waveguide input coupler (101), cascaded optical switches (102), unbalanced SWG waveguide pairs (103), a germanium silicon detector (104), and an external multi-channel power supply, wherein the waveguide input coupler (101), the cascaded optical switches (102), the unbalanced SWG waveguide pair (103), and the germanium silicon detector (104) are prepared on a silicon-on-insulator (SOI) substrate; the cascaded optical switches (102) comprise N+1 2×2 optical switches, each of the 2×2 optical switches comprises two 3-dB couplers (102a), two balanced waveguides (102b), and one phase shifter (102c), two output terminals of the former 3-dB coupler (102a) are separately connected to one waveguide (102b), one of the balanced waveguides (102b) is integrated with the phase shifter (102c), and other terminals of the two balanced waveguides (102b) are connected to two input terminals of a latter 3-dB coupler (102a); there are N pairs of unbalanced SWG waveguide pairs (103), each pair of unbalanced SWG waveguide pair comprises two unbalanced SWG waveguides, the two waveguides have different widths and lengths, an optical path difference of an $i^{th}$ unbalanced SWG waveguide pair is $OPD_i = 2^{i-1} OPD_1$, and a temperature-dependent phase difference shift is 0; and an output terminal of the waveguide input coupler (101) is connected to one input terminal of the first-stage optical switch of the cascaded optical switches (102), and an output waveguide of a former-stage optical switch is connected to an input waveguide of a latter-stage optical switch through the unbalanced SWG waveguide pair (103); and the germanium silicon detector (104) adopts a PIN structure, and is connected to one output terminal of the last-stage 2×2 optical switch of the cascaded optical switches (102), where control terminals of the N+1 2×2 optical switches are connected to the external multi-channel power supply.

In the silicon Fourier transform spectrometer of the present invention, the waveguide input coupler (101) adopts an inverse taper structure or a gating coupler structure, and an optical spectrum signal to be measured is input to a chip through optical fiber coupling.

In the silicon Fourier transform spectrometer of the present invention, the cascaded switch quantity N+1 is related to the quantity of resolvable wavelength points of the spectrometer.

In the silicon Fourier transform spectrometer of the present invention, the 2×2 optical switch adopts a 2×2 balanced Mach-Zehnder (MZI) structure, the 3-dB coupler (102a) adopts a multimode interferometer (MMI) structure or a directional coupler structure, and the phase shifter (102c) adopts a metal resistance or a waveguide resistance structure based on the thermo-optic effect.

In the silicon Fourier transform spectrometer of the present invention, the different unbalanced SWG waveguide pairs (103) adopt a same waveguide structure, and a length is increased proportionally, so that the optical path difference of the $i^{th}$ unbalanced SWG waveguide pair is $OPD_i = 2^{i-1} OPD_1$.

In the silicon Fourier transform spectrometer of the present invention, a mode spot converter is provided at the connection between the SWG waveguide and the 2×2 optical switch to reduce reflection loss of a device.

In the silicon Fourier transform spectrometer of the present invention, the states of the 2×2 optical switches are controlled through the external multi-channel power supply, to 3-dB splitting, cross or bar state. In this condition, two optical switches in a path are at the 3-dB splitting state, and the rest are at the bar or cross states, thereby constituting an unbalanced MZI structure with different optical path differences, wherein the optical path difference changes to $(1 \sim 2^N - 1) OPD_1$.

The present invention further provides a method for obtaining a spectral retrieval method by using the silicon Fourier transform spectrometer, comprising the steps of (i) inputting monochromatic optical signals in the wavelength range to be measured into the MZIs with different optical path differences, forming an interference pattern through optical-to-electrical conversion, and constituting a calibration matrix A with the spectra of all the MZIs; (ii) inputting an optical signal x to be measured, and measuring an output signal y using the germanium silicon detector in cases of different optical path differences; and (iii) reconstructing the original optical spectrum by using a reconstruction algorithm by setting a reasonable regular penalty term and a corresponding hyperparameter, to improve the quality of reconstructed spectrum.

Compared with the existing technology, beneficial effects of the present invention are mainly listed in the following aspects:

1. The states of the cascaded optical switches are adjusted to reconstruct MZIs with different optical path differences, thereby effectively increasing a quantity of resolvable wavelength points. Compared with other solutions, the structure has advantages of simple design, small chip size, and strong scalability, and is compatible with a temperature-insensitive design.

2. SWG waveguides with different widths and lengths are designed to balance an extra phase shift caused by the temperature, which eliminate the temperature drift of the central wavelength of the device. The operating bandwidth is also expanded by managing waveguide dispersion of the SWG structure. It has advantages of no need to introduce another material, temperature-insensitivity, large operating bandwidth, and being compatible with the CMOS process.

3. The optical spectrum to be measured is reconstructed by using a regularized regression algorithm to effectively reduce the requirement of the chip on the quantity of MZIs with different optical path differences and improve spectral resolution.

BRIEF DESCRIPTION OF THE DRAWINGS

FIGS. 4A to 4D show the working principle of the four-stage reconfigurable on-chip Fourier transform spectrometer according to one embodiment of the present invention, where

DETAILED DESCRIPTION OF THE INVENTION

To further clarify the objectives, technical solutions, and core advantages of the present solution, the present invention is further described in detail below with reference to the accompanying drawings and embodiments. It should be noted that the following specific embodiments are merely for explanatory purposes and are not intended to limit the present invention. In addition, technical features involved in the various embodiments can be combined with each other provided that they do not conflict with each other.

Figure 1:
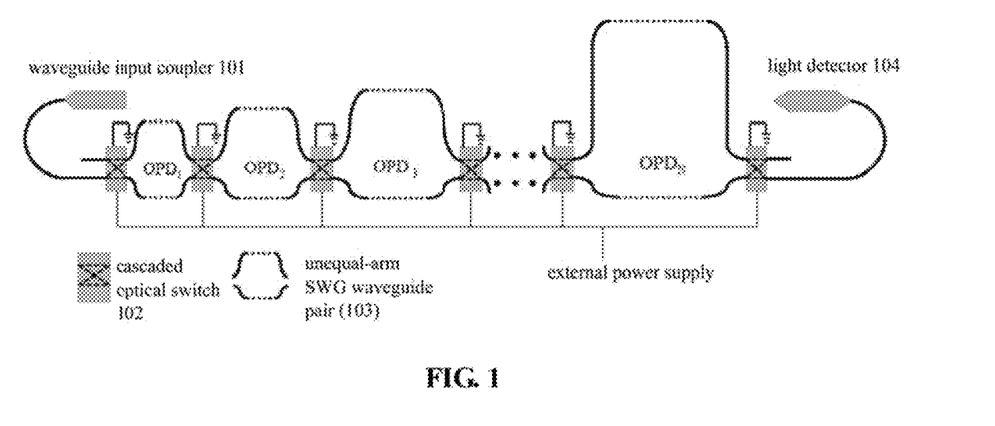
FIG. 1 shows the structure of the silicon Fourier transform spectrometer according to the present invention.

As shown in FIG. 1, the silicon Fourier transform spectrometer in the present invention comprises a waveguide input coupler 101, cascaded optical switches 102, unbalanced SWG waveguide pairs 103, a germanium silicon detector 104, and an external multi-channel power supply. The waveguide input coupler 101, the cascaded optical switches 102, the unbalanced SWG waveguide pair 103, and the germanium silicon detector 104 are prepared on a silicon-on-insulator platform.

Figure 2:
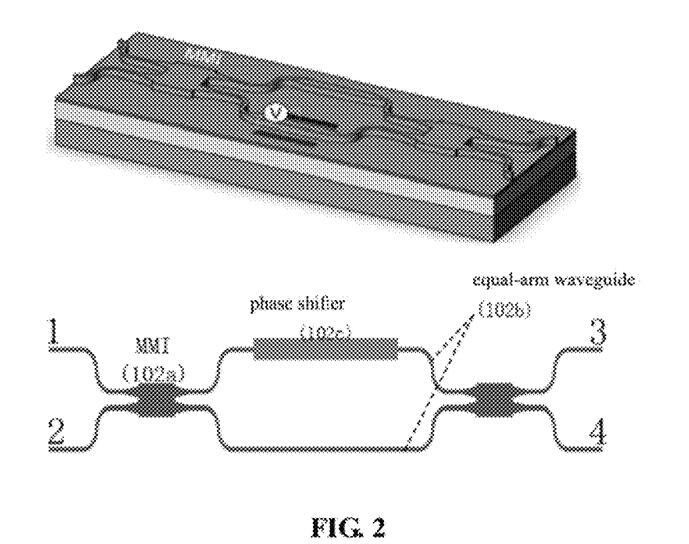
FIG. 2 shows the structure of the silicon-based optical switch according to one embodiment of the present invention.

The cascaded optical switches 102 include N+1 2×2 optical switches. The 2×2 optical switch includes two 3-dB couplers 102a, two balanced waveguides 102b, and one phase shifter 102c. Two output terminals of the former 3-dB coupler 102a are separately connected to one waveguide 102b, one of the balanced waveguides 102b is integrated with the phase shifter 102c, and the other terminals of the two balanced waveguides 102b are connected to two input terminals of the latter 3-dB coupler 102a.

There are N pairs of unbalanced SWG waveguide pairs 103. Each pair of unbalanced SWG waveguide pair includes two unbalanced SWG waveguides. The two waveguides have different widths and lengths, an optical path difference of an $i^{th}$ unbalanced SWG waveguide pair is $OPD_1=2^{i-1}OPD_1$, and the temperature-dependent phase difference shift is 0.

An output terminal of the waveguide input coupler 101 is connected to one input terminal of the first-stage optical switch of the cascaded optical switches 102, and two output waveguides of a former-stage optical switch are connected to two input waveguides of a latter-stage optical switch through the unbalanced SWG waveguide pair 103; and the germanium silicon detector 104 adopts a PIN structure, and is connected to one output terminal of the last-stage 2×2 optical switch of the cascaded optical switches 102, where control terminals of the N+1 2×2 optical switches are connected to the external multi-channel power supply.

The waveguide input coupler 101 adopts an inverse taper structure or a gating coupler structure, and an optical spectrum signal to be measured is input to a chip through optical fiber coupling.

The cascaded switch quantity N+1 is related to the quantity of resolvable wavelength points of the spectrometer.

The 2×2 optical switch adopts a 2×2 balanced Mach-Zehnder interferometer (MZI) structure, the 3-dB coupler 102a adopts a multimode interferometer (MMI) structure or a directional coupler structure, and the phase shifter 102c adopts a metal resistance or a waveguide resistance structure based on the thermo-optic effect.

Figure 3:
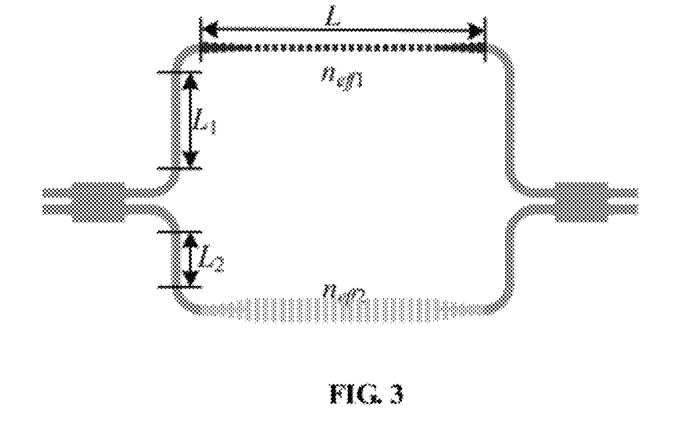
FIG. 3 shows the structure of the unbalanced SWG waveguide pair according to the present invention.

Different unbalanced SWG waveguide pairs 103 adopt a same waveguide structure, and a length is increased proportionally, so that the optical path difference of the $i^{th}$ unbalanced SWG waveguide pair is $OPD_1=2^{i-1}OPD_1$.

A mode spot converter is provided at the connection between the SWG waveguide and the 2×2 optical switch to reduce reflection loss of the device.

The 2×2 optical switch is controlled through the external multi-channel power supply, to work at the state of 3-dB splitting, cross or bar. In this condition, two optical switches in a path are at the 3-dB splitting state, and the rest are at the bar or cross states, thereby constituting an unbalanced MZI structure with different optical path differences, wherein the optical path difference changes to $(1\sim2^N-1)OPD_1$.

A method for obtaining a reconstructed spectrum of a light source by using the silicon Fourier transform spectrometer is provided, and the method includes the following steps: first, inputting monochromatic optical signals in the wavelength range to be measured into the MZIs with different optical path differences, forming an interference pattern through optical-to-electrical conversion, and constituting a calibration matrix A with the spectra of all the MZIs; then, inputting an optical signal x to be measured, and measuring an output signal y using the germanium silicon detector in cases of different optical path differences; and finally, reconstructing an original optical spectrum by using a reconstruction algorithm by setting a reasonable regular penalty term and a corresponding hyperparameter, to improve the quality of reconstructed spectrum.

In one embodiment of the present invention, the cascaded optical switches 102 comprise the N+1 2×2 optical switches, and the cascade quantity N+1 is related to the bandwidth and spectral resolution of the spectrometer. Each stage of the cascaded optical switches adopts a 2×2 balanced Mach-Zehnder interferometer (MZI) structure, and the structure is shown in FIG. 2, and comprises two 3-dB couplers 102a, two balanced waveguides 102b, and a phase shifter 102c. The external power supply is used to power up the phase shifter on the optical switch to change a phase difference between two arms, and the switch can be configured to the cross state, the bar state, and the 3-dB splitting state. The two output waveguides of the former-stage optical switch is connected to the two input waveguides of the latter-stage of optical switch through the unbalanced SWG waveguide pair 103.

Therefore, there are a total of N pairs of unbalanced SWG waveguide pairs 103, each pair comprises two unbalanced SWG waveguides, and the two waveguides have different widths and lengths, so that the two waveguides have an optical path difference $OPD_i$ (where i is a sequence number of an unbalanced SWG waveguide pair). Therefore, the state of the optical switch is changed, to digitally switch the optical path, and in combination with the unbalanced SWG waveguide pair, an asymmetric MZI structure with different optical path differences can be reconstructed.

The final output optical signal is detected by the germanium silicon detector 104, which is connected to one output terminal of the last-stage 2×2 optical switch of the cascaded optical switches. The optical power signal is converted into the electrical signal.

Based on the foregoing solution, the structure of the unbalanced SWG waveguide pair is shown in FIG. 3. To eliminate temperature sensitivity, according to an expression of the temperature-dependent phase difference shift $\partial\Delta\varphi/\partial T$ of the device:

$$\frac{\partial \Delta \varphi}{\partial T} = \frac{2\pi}{\lambda_0}\left(\frac{\partial n_{\mathit{eff}}}{\partial T}\Delta L + \frac{\partial \Delta n_{\mathit{eff}}}{\partial T}L\right)$$

where $\Delta n_{\mathit{eff}}$ represents the effective refractive index difference $n_{\mathit{eff}\,1} - n_{\mathit{eff}\,2}$ between two SWG waveguides with different widths, and therefore $\partial \Delta n_{\mathit{eff}}/\partial T$ is the difference between thermo-optic coefficients of the two SWG waveguides, and $\partial n_{\mathit{eff}}/\partial T$ is the thermo-optic coefficient of a conventional channel waveguide. The first term in brackets on a right side of an equal sign in the expression is greater than 0, and $\partial \Delta n_{\mathit{eff}}/\partial T$ in the second term may be less than 0. Therefore, the period, the duty cycle, and the waveguide width of SWG waveguides on two arms are designed, to adjust waveguide dispersion, so that the temperature-dependent phase difference shift of the device can be 0, thereby achieving a thermal condition within a relatively wide wavelength range. Through design, the optical path difference $OPD_i$ of the first-stage SWG waveguide pair is:

$$OPD_i = n_g \Delta L + (n_{g1} - n_{g2})L$$

where $n_{g1}$ and $n_{g2}$ are group refractive indices of the upper and lower SWG waveguides. For the i stage, if an optical path difference of $2^{i-1}OPD_1$ is to be realized, it is only necessary to correspondingly increase the length of the waveguide to satisfy the length difference $2^{i-1}\Delta L$ between waveguides of the same size, and the length of the waveguides with different widths is $2^{i-1}L$.

Figure 4A:
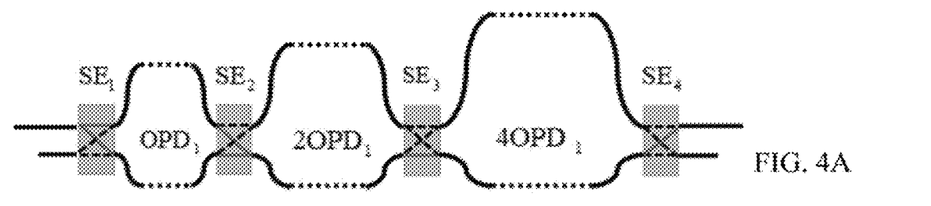
FIG. 4A shows that, when $SE_1$ and $SE_2$ operate at the 3-dB splitting state, the device is equivalent to an MZI with an optical path difference of $OPD_1$.

Based on the foregoing solution, a four-stage optical switch is used as an example to illustrate a specific working principle of the Fourier transform spectrometer:

As shown in FIGS. 4A through 4D, the structure comprises four 2×2 cascaded optical switches, and is named as $SE_k$ (k=1,2,3,4). Two optical switches are connected by using two unbalanced SWG waveguides. Optical path differences of the two unbalanced SWGs are $OPD_i$ (i=1, 2, 3, 4), where $OPD_i = 2^{i-1}OPD_1$. As shown in FIG. 4A, when $SE_1$ and $SE_2$ operate at the 3-dB splitting state, the device is equivalent to an MZI with an optical path difference of $OPD_1$.

Figure 4B:
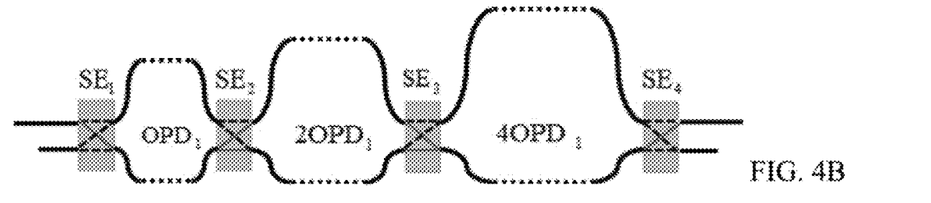
FIG. 4B shows that, when $SE_1$ operates at the cross state and $SE_2$ and $SE_3$ operate at the 3-dB splitting state, the device is equivalent to an MZI with an optical path difference of $2OPD_1$.

As shown in FIG. 4B, when $SE_1$ operates at the cross state, and $SE_2$ and $SE_3$ operate at the 3-dB splitting state, the device is equivalent to an MZI with an optical path difference of $2OPD_1$.

Figure 4C:
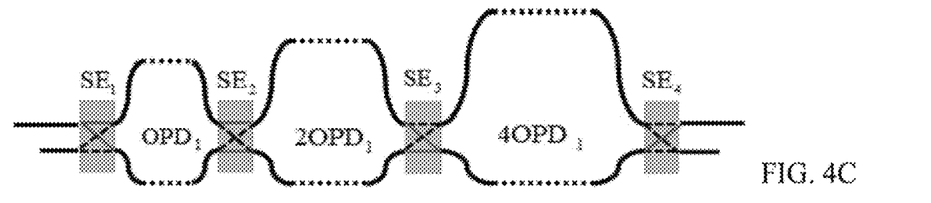
FIG. 4C shows that, when $SE_1$ and $SE_3$ operate at the 3-dB splitting state and $SE_4$ is at the bar state, the device is equivalent to an MZI with an optical path difference of $3OPD_1$.
Figure 4D:
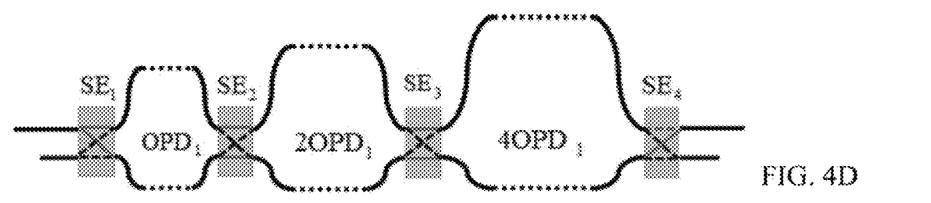
FIG. 4D shows the longest optical path difference.

As shown in FIG. 4C, when $SE_1$ and $SE_3$ operate at the 3-dB splitting state, and $SE_2$ is at the bar state, the device is equivalent to an MZI with an optical path difference of $3OPD_1$. The reset is deduced by analogy. The longest optical path difference is shown in FIG. 4D. When $SE_1$ and $SE_4$ operate at the 3-dB splitting state, and $SE_2$ and $SE_3$ operate at the bar state, the device is reconstructed as an MZI with an optical path difference of $7OPD_1$. For this four-stage cascaded optical switch structure, a total of seven MZIs with different optical path differences from $1OPD_1$ to $7OPD_1$ can be realized.

The embodiment shows that for (N+1)-stages cascaded optical switches and N-stages unbalanced SWG waveguide pairs, through digital selecting of optical paths, a total of $2^N-1$ MZIs with different optical path differences can be reconstructed, and the optical path differences are respectively $(1 \sim 2^N-1)\, OPD_1$. Therefore, the structure only needs to use N unbalanced waveguides and N+1 2×2 optical switches to achieve the same bandwidth and spectral as $2^N-1$ unbalanced MZI arrays. It greatly simplifies design complexity of the chip and reduces a device size.

Figure 5:
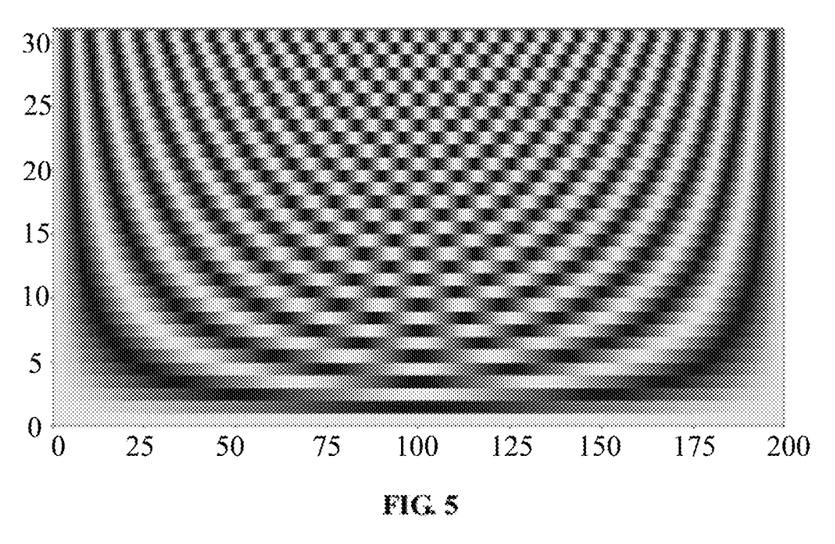
FIG. 5 shows the typical calibration matrix A according to one embodiment of the present invention.

Based on the foregoing solution, the Fourier transform spectrometer needs to be calibrated before a formal test. States of all optical switches are adjusted, and there are a total of $2^N-1$ unbalanced MZIs with different optical path differences. A tunable laser source scans the wavelength in the optical spectrum range to be measured, and there are a total of m wavelength points. The monochromatic continuous wave from the tunable laser source is input into each MZI, and the optical signal after the interferometer is converted into the electrical signal through the on-chip germanium silicon detector, and then is recorded by a data acquisition card. In the way, a $(2^N-1)\times m$ calibration matrix A can be obtained, where each row in the matrix represents a transmission spectrum, and each column represents discrete sampling points of an interference pattern. A typical calibration matrix is shown in FIG. 5. In addition to being used for regularization reconstruction of input spectrum, the calibration matrix can also eliminate the phase errors caused by manufacturing and different fringe contrast caused by waveguide loss. A polychromatic optical signal x to be measured is a vector with m elements, and each element represents power at the corresponding wavelength and can be expressed as y=Ax, where y is the measured interference pattern and is a vector with $2^N-1$ elements. Therefore, information about the optical spectrum of polychromatic light to be measured can be recovered by obtaining x from y.

Based on the foregoing solution, because m is far greater than $2^N-1$, there are many solutions in the foregoing matrix equation x, but an accurate solution often cannot be obtained by using a conventional pseudo-inverse matrix method. In the present invention, a machine learning algorithm is used to accurately reconstruct the optical spectrum to be measured. Different regularized regression algorithms have different advantages, disadvantages, and trial ranges. Table 1 lists several common reconstruction algorithms.

TABLE 1

| Algorithm name | Problem solving |
| --- | --- |
| Ridge | $\min_x\{\|y - Ax\|_2^2 + \alpha_2\|x\|_2^2\}$ |
| Lasso | $\min_x\{\|y - Ax\|_2^2 + \alpha_1\|x\|_1\}$ |
| BPDN | $\min_x\{0.5 \times \|y - Ax\|_2^2 + \alpha_1\|x\|_1\}$ |
| RBF Network | $\min_c\{\|y - Ah_c\|_2^2\},\ h_c = Kc = \sum_{d=1}^{D} C_d e^{-\beta|\lambda - \lambda_d|^2}$ |
| Elastic-Net | $\min_{x,\,x>0}\{\|y - Ax\|_2^2 + \alpha_1\|x\|_1 + \alpha_2\|x\|_2^2\}$ |
| Elastic-D1 | $\min_{x,\,x>0}\{\|y - Ax\|_2^2 + \alpha_1\|x\|_1 + \alpha_2\|x\|_2^2 + \alpha_3\|D_1 x\|_2^2\}$ |

Because some of optical spectra to be measured are relatively sparse (including only a few discrete wavelength components), and some have a large quantity of continuous spectrum, applicability of different algorithms should be considered when an algorithm is selected. The $L_1$ norm term is mainly used to increase sparsity, which has a good effect on reconstructing the sparse spectrum. And the $L_2$ norm term mainly prevents overfitting. The foregoing two terms have a good effect on reconstructing the sparse optical spectrum. However, due to lack of a constraint on optical spectrum continuity, a continuous optical spectrum cannot be accurately recovered by including only the $L_1$ and $L_2$ norm terms. Introducing the $L_2$ norm term of a first-order difference matrix of the optical spectrum can increase the continuity of the optical spectrum to a certain extent. Therefore, among the foregoing several algorithms, the Elastic—D1 algorithm can be used to reconstruct various types of different optical spectra more accurately. However, because values of the three hyperparameters need to be calculated, the calculation complexity is increased. However, each term in the algorithm is greater than 0, so that a standard convex optimization tool can be used for calculation.

The foregoing content is the specific implementation solution of the silicon Fourier transform spectrometer chip in the present invention and can be easily understood by persons in scientific research or industrial departments in the same field. The foregoing content is merely preferred embodiments of the present invention and is not intended to limit the present invention. Any modification, equivalent replacement, and improvement made within the spirit and principle of the present invention shall be included in the protection scope of the present invention.

Compared with a conventional passive MZI array structure, this can effectively reduce the size of the chip and improve the performance of the device; and the unbalanced SWG waveguide pairs can effectively improve temperature stability of the chip. The present invention can meet an application requirement of the Fourier transform spectrometer on miniaturization and portability, and can resolve a problem that a spectrometer on an existing silicon platform is generally sensitive to temperature.

We claim:

1. A silicon Fourier transform spectrometer, comprising:
   a waveguide input coupler (101),
   cascaded optical switches (102),
   unbalanced subwavelength grating (SWG) waveguide pairs (103),
   a germanium silicon detector (104), and
   an external multi-channel power supply,
   wherein the waveguide input coupler (101), the cascaded optical switches (102), the unbalanced subwavelength grating (SWG) waveguide pairs (103), and the germanium silicon detector (104) are prepared on a silicon-on-insulator (SOI) platform;
   the cascaded optical switches (102) comprise N+1 2×2 optical switches, each of the 2×2 optical switches comprises two 3-dB couplers (102*a*), two balanced waveguides (102*b*), and one phase shifter (102*c*), two output terminals of the former 3-dB coupler (102*a*) are separately connected to one waveguide (102*b*), one of the balanced waveguides (102*b*) is integrated with the phase shifter (102*c*), and the other terminals of the two balanced waveguides (102*b*) are connected to two input terminals of the latter 3-dB coupler (102*a*);
   there are N pairs of unbalanced SWG waveguide pairs (103), each pair of unbalanced SWG waveguide pairs comprises two unbalanced SWG waveguides, the two waveguides have different widths and lengths, the optical path difference of an $i^{th}$ unbalanced SWG waveguide pair is $OPD_i=2^{i-1}OPD_1$, and the temperature-dependent phase difference shift is 0;
   the output terminal of the waveguide input coupler (101) is connected to one input terminal of the first-stage optical switch of the cascaded optical switches (102), and the two output waveguides of a former-stage optical switch are connected to the two input waveguides of a latter-stage optical switch through the unbalanced SWG waveguide pair (103); and the germanium silicon detector (104) adopts a PIN structure, and is connected to one output terminal of the last-stage 2×2 optical switch of the cascaded optical switches (102), where control terminals of the N+1 2×2 optical switches are connected to the external multi-channel power supply.

2. The silicon Fourier transform spectrometer as described in claim 1, wherein the waveguide input coupler (101) adopts an inverse taper structure or a gating coupler structure, and an optical spectrum signal to be measured is input to a chip through optical fiber coupling.

3. The silicon Fourier transform spectrometer as described in claim 1, wherein the cascaded switch quantity N+1 is related to the quantity of resolvable wavelength points of the spectrometer.

4. The silicon Fourier transform spectrometer as described in claim 1, wherein the 2×2 optical switch adopts a 2×2 balanced Mach-Zehnder (MZI) structure, the 3-dB coupler (102*a*) adopts a multimode interference (MMI) structure or a directional coupler structure, and the phase shifter (102*c*) adopts a metal resistance or a waveguide resistance structure based on the thermo-optic effect.

5. The silicon Fourier transform spectrometer as described in claim 1, wherein different unbalanced SWG waveguide pairs (103) adopt a same waveguide structure, and the length is increased proportionally, so that the optical path difference of the $i^{th}$ unbalanced SWG waveguide pair is $OPD_i=2^{i-1}OPD_1$.

6. The silicon Fourier transform spectrometer as described in claim 1, wherein a mode spot converter is provided at the connection between the SWG waveguide and the 2×2 optical switch to reduce reflection loss of a device.

7. The silicon Fourier transform spectrometer as described in claim 1, wherein the 2×2 optical switch is controlled through the external multi-channel power supply, to work in a state, wherein the state is either a 3-dB splitting state, a cross state or a bar state; wherein, two optical switches in a path are at the 3-dB splitting state, and the rest are at the bar or cross state, thereby constituting an unbalanced MZI structure with different optical path differences, wherein the optical path difference changes to $(1\sim 2^N-1)OPD_1$.

8. A method for obtaining a reconstructed optical spectrum of a light source by using the Fourier transform spectrometer on a silicon substrate as described in claim 1, comprising:
   (i) inputting monochromatic optical signals in the wavelength range to be measured into the MZIs with different optical path differences, forming an interference pattern through optical-to-electrical conversion, and constituting a calibration matrix A with the spectra of all the MZIs;
   (ii) inputting an optical signal x to be measured, and measuring an output signal y using the germanium silicon detector in cases of different optical path differences; and
   (iii) reconstructing the original optical spectrum by using a reconstruction algorithm by setting a regular penalty term and a corresponding hyperparameter, to improve the quality of the reconstructed spectrum.

\* \* \* \* \*